July 14, 1942.  C. H. CUNO  2,289,539
FILTER
Filed Jan. 5, 1940  3 Sheets-Sheet 1

INVENTOR
Charles H. Cuno
BY
ATTORNEY

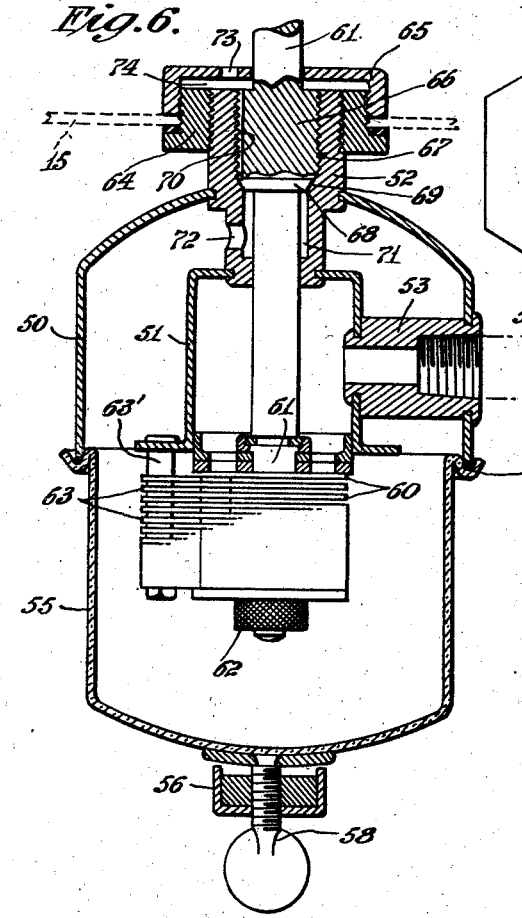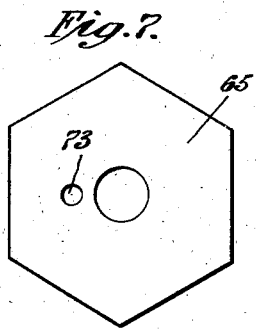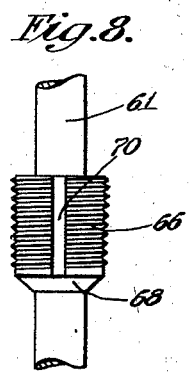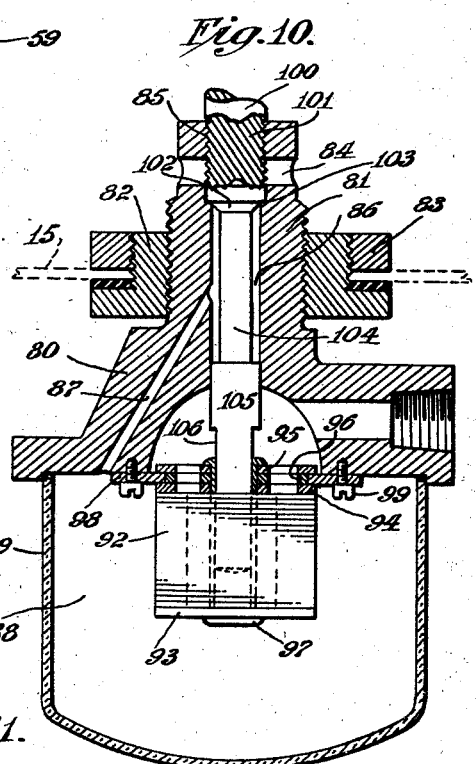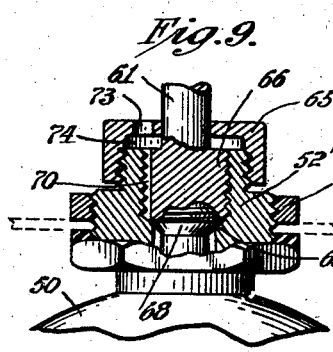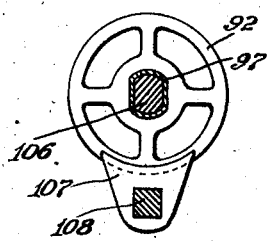

July 14, 1942.   C. H. CUNO   2,289,539
FILTER
Filed Jan. 5, 1940   3 Sheets-Sheet 3
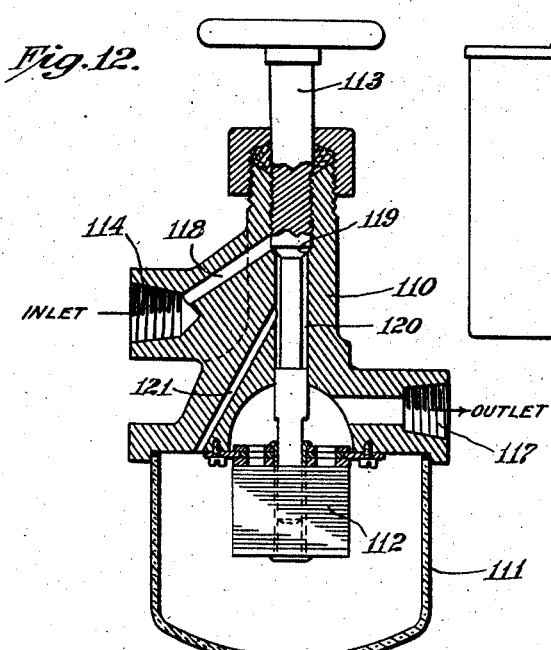
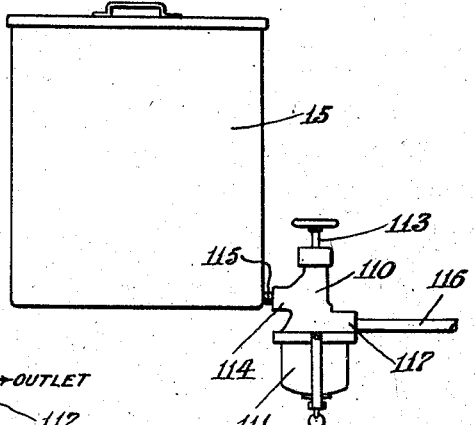
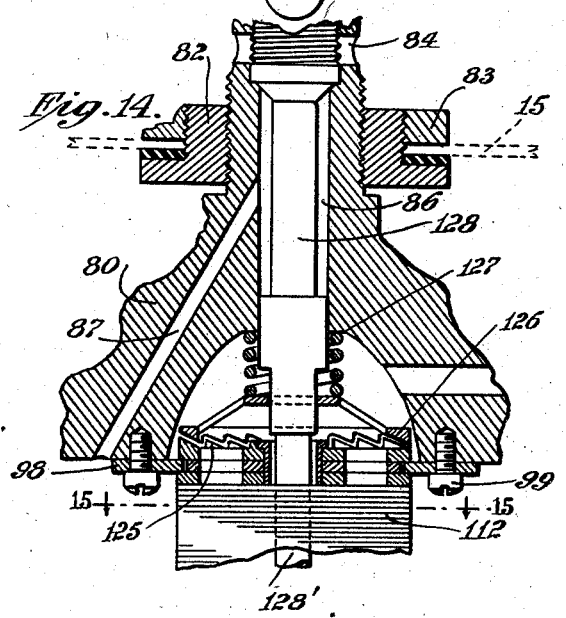
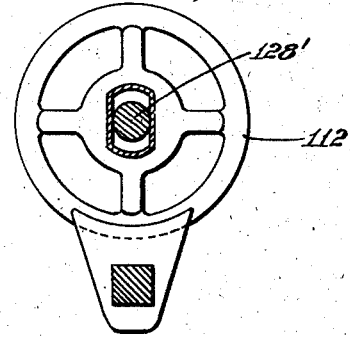
INVENTOR
Charles H. Cuno
BY
ATTORNEY Patented July 14, 1942

2,289,539

UNITED STATES PATENT OFFICE 2,289,539

FILTER

Charles H. Cuno, Meriden, Conn., assignor to The Cuno Engineering Corporation, Meriden, Conn., a corporation of Connecticut Application January 5, 1940, Serial No. 312,494

9 Claims. (Cl. 210—167)

My invention relates particularly to filters for removing foreign substances from the fuel oil supply for space heaters.

The filter structure per se may be of various types preferably such as shown in my Patent No. 1,657,346 or in the Fulcher Patent No. 1,581,998, but the broad idea may be applied to other well known types having movable cleaning or filtering elements for instance of the changeable fabric type. In any case it is desirable to either renew or clean the filtering element from time to time so that a more efficient filtering action will take place and so that it will not get clogged up.

Various types of automatic devices have been employed but it is my present object to provide a very simple and inexpensive arrangement to ensure the cleaning or renewing actions whenever the flow of liquid from the supply tank is started or stopped. The mechanism may be arranged to simultaneously operate a shut-off valve and the filter cleaning or renewing means; the operation of the filter means may take place as the valve is opened and as it is closed or, by interposing a ratchet clutch mechanism between the valve and filter, the operation of the filter means may be performed only as the valve is turned in one direction. In any of these ways I eliminate the possibility of the filter becoming plugged because of neglect or ignorance of its mode of operation.

Fig. 6 is a vertical sectional view showing a second form of shut-off valve and cleaner control for the filter.

Fig. 7 is a plan view of a stop device of Fig. 6.

Fig. 8 is a side view of a fragment of the control shaft.

Fig. 9 is a vertical sectional view of a modified construction of filter mounting.

Fig. 10 is a vertical sectional view of a third form of filter support with a control valve and cleaner arrangement.

Fig. 11 is a detail horizontal sectional view showing the connections between the movable filter cleaner element and the control shaft.

Fig. 12 is a sectional view showing another modification of the filter construction.

Fig. 13 is a side view showing an installation involving the form of Fig. 12.

Fig. 14 is a sectional view showing a ratchet connection for the filter.

Fig. 15 is a sectional view on the plane of line 15—15 of Fig. 14.

Figure 1:
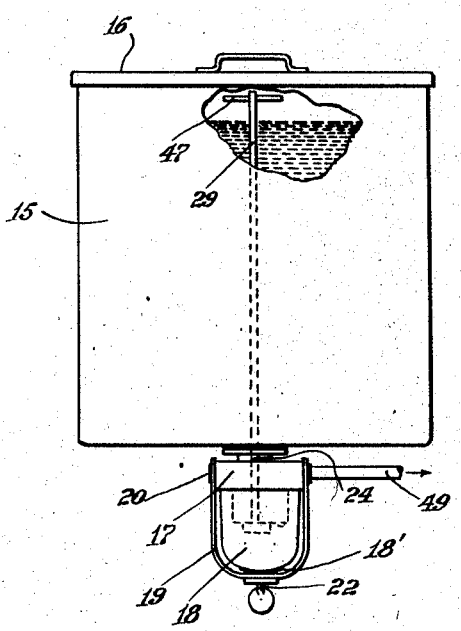
Fig. 1 is a side view on a small scale of a supply tank or reservoir and filter installation with a shut-off and cleaner device embodying one form of my invention.
Figure 2:
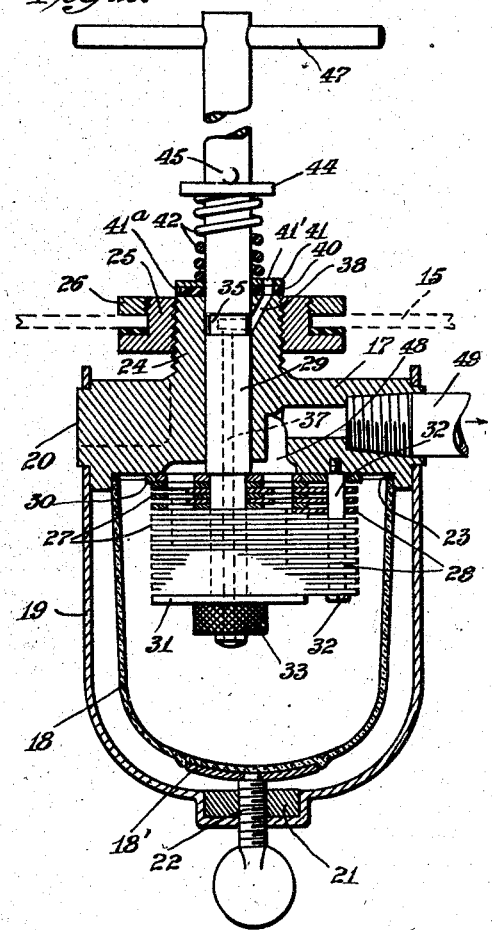
Fig. 2 is a vertical sectional view of one form of filter with one form of control valve and cleaner device of my invention shown on an approximately full scale.
Figure 3:
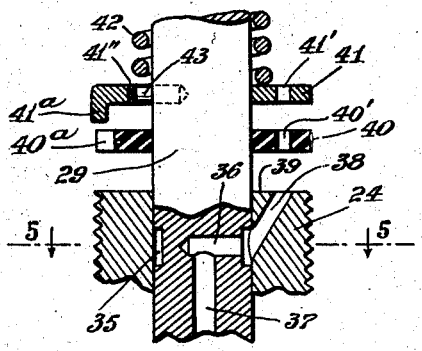
Fig. 3 is a fragmentary exploded sectional view showing the cleaner control shaft and shut-off valve of Fig. 2.
Figure 4:
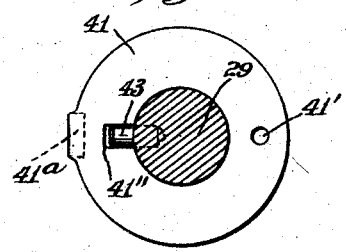
Fig. 4 is a plan view of one of the valve parts.
Figure 5:
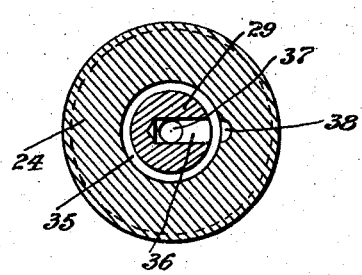
Fig. 5 is a horizontal sectional view of the control shaft on the plane of the line 5—5 of Fig. 3.

The tank or supply reservoir 15 may be of any suitable type and may have a removable cover 16. In the form shown, the filter casing consists of a head 17 and a sump 18 suitably connected together for instance by a bail 19 hinged to the hubs 20 and provided with a threaded portion 21 for the clamp screw 22 which engages the bottom of the sump to press it toward the head. A gasket or packing ring 23 may be used. A washer 18' may be interposed between 22 and 18.

To secure the filter casing to the tank, I may provide the head with a screw threaded neck 24, on which is threaded a collar 25. A clamp nut 26 serves to secure the collar and attached filter head to the bottom wall of the tank. If desired collar 25 may be integral with the tank and nut 26 eliminated.

The filtering and cleaning device in this particular form consists of a set of spaced perforated plates or discs 27 and a set of interposed cleaner fingers 28. The perforated plates 27 are carried by a central shaft 29 and are all supported between a top plate 30 and a bottom plate 31. The cleaner fingers or scrapers are all carried by the square post 32 threaded into head 17 and locked against rotation by plate 30 which has a square hole fitting the square post and holding it in correct angular position.

The filter unit is held on to the shaft 29 by a nut 33 on the lower end. Adjacent the bottom of the tank the shaft has a groove 35 and a cross passage 36 connecting the groove with the central passage 37 which extends down through the shaft and opens into the sump chamber. The neck of the casing head has a passage 38 which connects with the groove 35. The upper surface 39 of the neck constitutes a smooth seat for the valve member 40 which has an opening 40' through which liquid may pass when it registers with the upper end of passage 38. This valve member may be made of suitable material and held in place by a washer 41 and spring 42 on the shaft 29. The washer 41 has a passage 41' and is keyed to the shaft by a pin 43 which extends into the notch 41". The lug 41a on the washer extends into a notch 40a in the valve member. A washer 44 and pin 45 take up the thrust of the spring 42 which thus holds the filter unit in place and holds the valve resiliently against its seat.

The shaft 29 is provided with a handle 47 or other suitable means for rotating the shaft—in this case the shaft and filter plates may be rotated in either direction. As the parts are shown, the valve is open and liquid can flow from the tank through passages 38, 35, 36 and 37 to the sump chamber—thence through the spaces between the filter plates to the passage 48 and to the discharge pipe 49 which leads to the heater or other delivery point. The sump may be of glass or other transparent material to indicate when there is liquid in it and also to reveal any dirt that may need to be removed.

From the foregoing it will be seen that whenever the shaft and valve are turned to shut off the flow of liquid or to turn on the liquid the filter plates 27 will be turned relative to the stationary scraper or cleaner fingers 28 thus removing the sludge or other material which has previously collected on the edges of the plates, and the openings of the peripheral slots between them.

In the form shown in Fig. 6, the head of the casing consists of an outer shell 50 and an inner shell 51 both secured to the inlet member 52. The outlet member 53 leads from the chamber in shell 51 to the delivery pipe 54. The sump 55 is held detachably in place by a bail 56 (similar to 19) and clamped by screw 58. A gasket 59 affords a tight joint.

The thin spaced filter plates 60 are carried by shaft 61 being held thereto by a nut 62. The cleaner or scraper fingers 63 are supported by the post 63' which is attached to the lower edge of the shell 51.

The inlet member 52 is secured in a threaded collar 64 which is clamped to the bottom of the tank 15 by an inverted cup or bonnet 65.

The shaft 61 has a threaded portion 66 in threaded engagement with a threaded passage 67 in the inlet member. The shaft has a valve member 68 which coacts with a valve seat 69 in the inlet member and a groove 70 extends from the upper end of the threaded portion to the valve.

The inlet member has an annular passage 71 with a discharge outlet 72 leading to the inside of the casing chamber. The bonnet 65 has one or more passages 73 leading to a space 74 above the upper end of groove 70 so that liquid from the tank may flow through 73, 74, 70 past the valve 68 (when raised from 69) 71, 72, through the passages between the filter plates 60, into shell 51 and through the outlet 54 to the delivery point. When the shaft 61 is turned to move the valve the filter unit 60 is also turned thereby scraping off any deposit into the sump 55. The scraper fingers 63 are sufficiently resilient and flexible to permit the unit 60 and shaft 61 to move endwise sufficiently to seat and unseat the valve as the shaft is rotated. The bonnet 65 serves as a stop to limit the upward movement of the threaded portion 66 of the shaft 61.

In the form of connection shown in Fig. 9, the bonnet 65 is screwed directly onto the inlet member or coupling 52' so that it can be put in place before the filter is secured or clamped to the bottom of the tank by nut 76. In other words, the stop is fixed relative to the shaft 61 independently of the clamping of the filter to the tank.

In the form shown in Fig. 10 the casing head 80 which carries the various parts of the filter and the valve and cleaning mechanism has a threaded neck 81 mounted in a sleeve 82 which is clamped by a nut 83 to the bottom wall of the tank. This head has passages 84, 86 and 87 leading to the chamber 88 in the lower part or sump 89 of the casing. This part 89 may be detachably fastened in place as before by a bail 90 and screw 91.

The filter unit 92 has a bottom disc 93, a top disc 94, a cover disc 95 and a smaller disc 96 all held together by a tubular rivet 97. The ring 98 serves as a bearing for the upper end of the filter unit and is held to the head 80 by a number of screws 99.

The actuating shaft 100 has a threaded portion 101 which turns in the threaded passage 85 of the neck, a valve member 102 adapted to coact with the seat 103 at the upper end of passage 86, a reduced diameter 104 to leave the passage 86 leading to passage 87, a portion 105 which has a running fit in the head, and a flattened portion 106 which can slide up and down in a correspondingly sectioned passage in the tubular rivet 97 as the shaft rotates. This permits a considerable vertical movement of the valve sleeve without applying any up and down stress upon the filter unit. The scraper fingers 107 as shown in Fig. 11 are carried by the post 108 which is a part of the filtering and cleaning device per se.

In this form also it will be seen that the movement of the valve to control the flow of liquid is effected simultaneously with the cleaning of the filter by common means.

It should be understood that the same combination of valve and cleaning or renewing means may be applied to various types of filters and may be connected not only at the bottom of the supply tank but at other points in the pipe line for instance by mounting the filter per se on a T fitting with one side carrying the filter and the operating handle projecting through a gland on the other side of the T.

When the filter is applied directly to the tank the operating handle may be concealed inside of the tank as shown or it might be extended outside of the tank or through the cover for more convenient access.

Figs. 12 and 13 show a modified form having a casing with a head 110 and a sump 111 held together in any suitable manner. The filtering unit 112 is supported by the head inside of the casing and is actuated by a shaft or stem 113 which projects outside of the casing. The connections between the stem and the casing head and between the stem and the rotatable part of the filter for the purpose of cleaning may be the same as shown in Figs. 10 and 11. The head and parts are constructed so as to permit the filter to be installed entirely outside of the tank 15 by insertion in the discharge or delivery pipe line. For instance the inlet 114 may be attached to the discharge nipple or spud 115 of the tank and the discharge pipe 116 may be connected to the outlet 117.

The head is provided with a passage 118 leading to the valve 119 and passages 120 and 121 leading to the chamber in which the filter unit is located. The action of the filter cleaning and valve action is similar to that previously described.

Fig. 14 shows another arrangement in which the filter unit has a ratchet 125 adapted to be actuated by a ratchet 126 carried by the shaft 128. A spring 127 serves to yieldingly press the upper ratchet against the lower ratchet. Of course in this form of device the cleaning and valve actions are accomplished by turning the stem or shaft 128 back and forth. The casing head and valve mechanism for controlling the flow of oil from the tank above (not shown) to the passages leading to the filtering chamber are the same as that shown in Fig. 10 but may be the form shown in Fig. 6 for instance. In this case the shaft or stem is not connected to the bushing of the filter unit as shown in Fig. 11 but rotates independently in one direction. The cylindrical portion 128' assists in supporting the filter unit but without influencing its rotation.

I claim:

1. In combination, a fuel tank, a housing connected to said fuel tank and having an inlet opening communicating with the interior of said fuel tank, said housing having an outlet opening therein, a rotatable closure for said inlet opening for opening and closing the latter, a rotatable filter in said housing between said inlet and outlet openings arranged whereby liquid passing through said housing passes through said filter, means in said housing engaging said filter for cleaning the latter when it is rotated, and a single shaft connected to said closure and filter for simultaneously rotating them, said shaft extending through said inlet opening and into said fuel tank.

2. In combination, a fuel tank having a bottom wall with an opening therein, a housing having a portion thereof located in said opening and secured to said wall, said portion having an opening therein communicating with the tank, a valve seat in said last mentioned opening, a rotatable shaft extending through said opening and terminating at one end within said housing, said shaft having a valve thereon cooperating with said seat to close said opening, a filter secured to the end of the shaft within the housing and arranged whereby liquid passing through the housing passes through the filter, means within the housing for cleaning the filter when it is rotated, and a handle on the other end of the shaft for rotating the latter.

3. In a filter system, a supply tank, a filter supported by the tank and having a filtering element movable to present fresh filtering areas, an actuating shaft passing through a wall of the tank into the filter for actuating the movable element, and a valve actuated by said shaft and controlling the passage of liquid from the tank through the filter.

4. A filter comprising a casing having a head with means for connecting it to a supply tank and having an outlet in the head and a removable sump, a filter element within the sump movable to present fresh filtering areas, said head having passages for liquid to pass from the tank to the sump and through the filter element to the outlet, a valve coacting with a part of the casing head to control the flow of liquid through said passages, and means in common for actuating the valve and the filter element.

5. A filter comprising a casing having an inlet member and an outlet member, a sump in the casing, a filter element in the sump between the inlet and outlet members, said element being movable to clean the same, a shaft for rotating said filter element and valve means in said inlet member and actuated by said shaft for controlling the flow of liquid through said inlet and into the sump, said valve means including an internally screw threaded portion in the inlet member, an externally screw threaded portion on the shaft adapted to coact with said portion in the inlet member, at least one of said screw threaded portions being formed to provide a groove extending from the top to the bottom of one of said portions, said inlet member having an inwardly extension member formed with a passage communicating with said groove and with the interior of the sump, the externally screw threaded portion of the shaft being formed with a shoulder adapted to close the passage communicating with said groove upon rotation of the shaft.

6. A filter comprising a casing having a head portion with an upstanding neck portion having an inlet, an outlet in said head portion, a sump in the casing, a rotatable filter element in the sump, a shaft for rotating said filter element and valve means actuated by said shaft for controlling the flow of liquid through the inlet and into the sump, said valve means including a passage in the neck portion leading from the inlet, a passage in said head portion communicating with the passage in the neck and with the interior of the sump, a valve member on the shaft above the inlet in the neck and having an opening communicating with the inlet, a washer member keyed on said shaft above said valve member and having an opening registering with the opening in the valve member, a coupling between the washer and valve member whereby movement of the shaft moves the valve member to open or close the inlet and a cleaning device coacting with the filter element to clean the same when the filter element is rotated.

7. As an article of manufacture, a combined fluid filtering and flow controlling device as a unit comprising a casing having inlet and outlet passages, a sump, a movable filtering element within said casing between the inlet and outlet passages and adapted to present clean filtering surfaces on being moved, valve mechanism to control the flow of liquid through said element, a shaft movably supported by and at least partly within said casing and forming part of said valve mechanism and connected to said element whereby movement of the shaft causes variations in the flow of fluid through said passages and movement of the movable element, said casing forming a second part of the valve mechanism.

8. A filter casing having a filtering chamber with an inlet and an outlet, a rotatable filtering unit supported in said chamber, a stationary cleaning unit cooperating to clean the filtering unit when the latter is rotated, a valve controlling the passage of liquid through the filtering unit and a valve stem having a sliding connection with said filtering unit for rotating said unit and actuating said valve.

9. In combination, a tank for liquid fuel having an opening in the bottom, a filter casing detachably secured in said opening including a head having an inlet communicating with the interior of the tank and an outlet discharging toward one side and a sump detachably secured to the head, a filter unit secured to said head and depending into said sump and including a rotatable element having filtering passages connected respectively with the inlet and outlet and a vertical recess and a cleaning element coacting with the rotatable element to clean the same when the element is rotated, an actuating shaft detachably secured in said head and having a portion slidable in said vertical recess and a valve attached to said shaft for controlling the inlet in said head.

CHARLES H. CUNO.